Dec. 11, 1962 W. J. SACKETT, SR 3,068,076
MATERIALS HANDLING SYSTEM
Filed July 19, 1960 5 Sheets-Sheet 1

INVENTOR
WALTER J. SACKETT, SR.
BY *Walter G. Finch*
ATTORNEY

Dec. 11, 1962   W. J. SACKETT, SR   3,068,076
MATERIALS HANDLING SYSTEM
Filed July 19, 1960   5 Sheets-Sheet 3

WALTER J. SACKETT, SR.
INVENTOR

BY *Walter G. Finch*
ATTORNEY

Dec. 11, 1962 W. J. SACKETT, SR 3,068,076
MATERIALS HANDLING SYSTEM

Filed July 19, 1960 5 Sheets-Sheet 4

WALTER J. SACKETT, SR.
INVENTOR

BY *Walter G. Finch*
ATTORNEY

WALTER J. SACKETT, SR.
INVENTOR

United States Patent Office 3,068,076
Patented Dec. 11, 1962

3,068,076
MATERIALS HANDLING SYSTEM
Walter J. Sackett, Sr., Baltimore, Md., assignor to The
A. J. Sackett & Sons Company, Baltimore, Md., a corporation of Maryland
Filed July 19, 1960, Ser. No. 43,837
17 Claims. (Cl. 23—259.1)

This invention relates generally to apparatus for producing fertilizer and more particularly to a process and apparatus for compounding, blending, ammoniating, acidulating and granulating plant foods.

Although this invention is described in connection with the processing of plant foods, it is not limited thereto as it can be most readily adapted for processing any type of ingredients which are to be thoroughly compounded, blended, and granulated together.

It is an object of this invention to provide a novel process and system for compounding, blending, ammoniating, acidulating and granulating plant foods, such as fertilizers.

Another object of this invention is to provide a novel system for handling and processing of ingredients in a continuous manner.

Another object of this invention is to provide a novel process and materials handling system for use in the plant food industry.

Still another object of this invention is to provide an economical, efficient and reliable process and apparatus therefor for processing of plant foods and the like.

These and other objects and advantages of this invention will become more readily apparent from the following detailed description and accompanying drawings in which.

Figure 1:
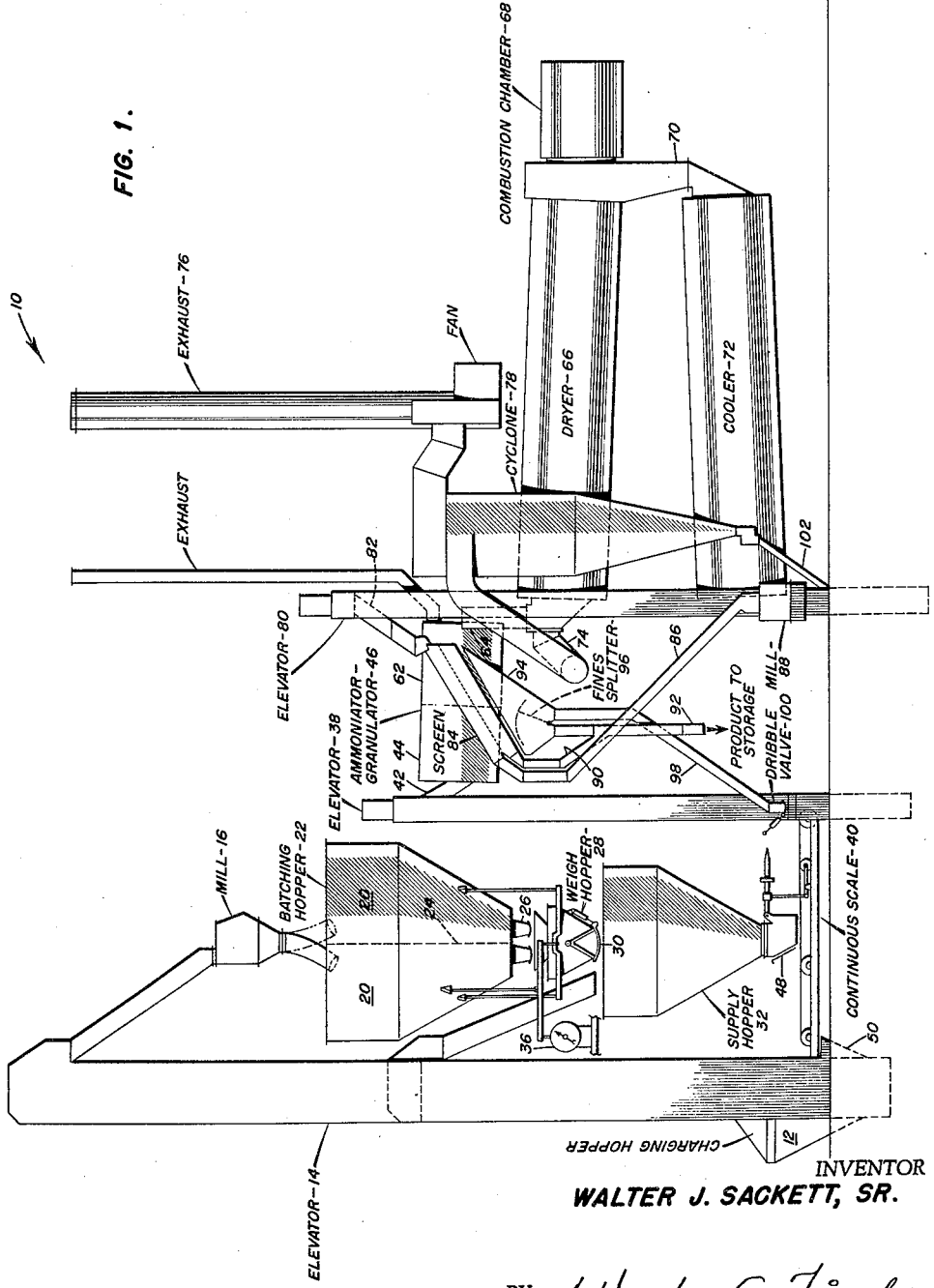
FIG. 1 is a generally diagrammatic illustration of the various components of the apparatus of the present invention incorporating novel features thereof.

Referring first to FIG. 1 of the drawings, there is shown a plant 10 arranged for the manufacture of granular mixed goods, such as plant foods, fertilizer, or the like. Various unweighed bulk ingredients are delivered, by payloaders or the like, to a charging hopper 12 from which they are conveyed by a steel cased bucket elevator 14 to an elevated mill 16 whose function it is to reduce any oversize materials.

The materials are then guided by a chute 18 into one of a plurality of compartments 20 which are arranged within the batching hopper 22. The batching or storage hopper 22 is preferably made of heavy steel plate construction and can be provided wtih segmental partitions 24 to accommodate up to eight ingredients. The particular hopper 22 disclosed in FIG. 1 is divided into four compartments 20, each of which is equipped with a pneumatically operated cut-off valve 26 at the bottom of the hopper 22.

Directly beneath the batching hopper 22, and suspended therefrom, is a weigh hopper 28 which receives the various ingredients as they are delivered through the air operated valves 26. This weigh hopper 28, whose construction and functions shall be detailed subsequently, is provided with a large pneumatically operated valve 30 for rapid discharge of the ingredients into a supply hopper 32 therebelow.

Figure 2:
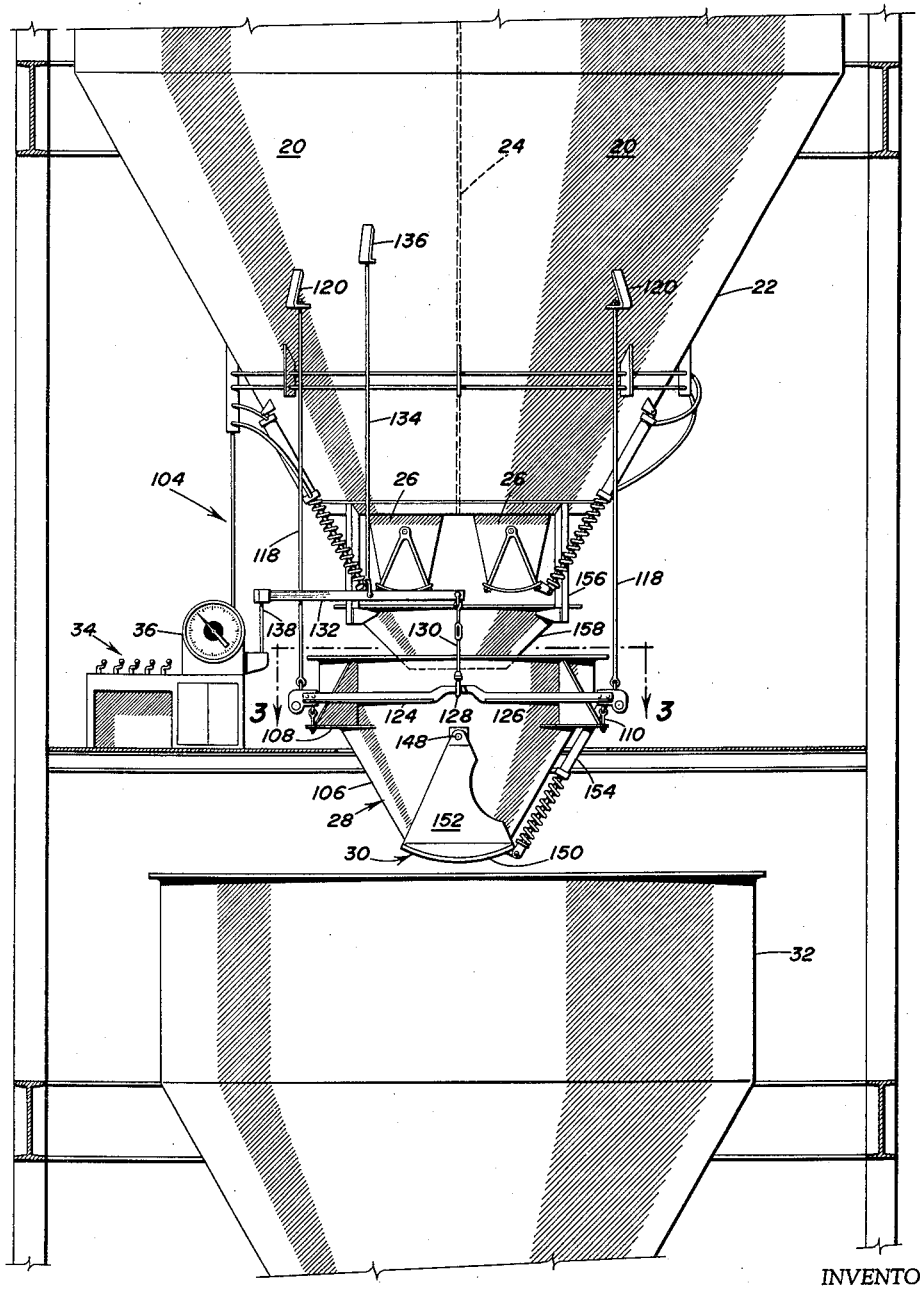
FIG. 2 is an elevation of a hopper whose function it is to weigh and mix the various materials comprising the fertilizers to be produced by the process and apparatus of the present invention.

The weighing of the various ingredients as well as the discharge of a completed batch is accomplished from a central control console 34 located directly in front of a scale dial 36 as shown best in FIG. 2. The scale furnished with this system is equipped with a recording device which will provide a daily printed record of the batch weighing accomplished during an operating period.

Upon completion of weighing of the component ingredients, the batch becomes thoroughly mixed upon discharging from the weigh hopper 28 into the supply hopper 32. The mixed solid ingredients are then transferred from hopper 32 to a second elevator 38 by means of a self-compensating type continuous weighing machine 40.

This machine 40 supplies an accurately controlled flow of the blended solid ingredients by elevator 38 and chute 42 to the ammoniating section 44 of a combination ammoniator granulator 46.

Before proceeding further, it should be explained that quite frequently upon completion of any operating period, a considerable amount of the various ingredients will more than likely remain within the compartments 20 of the batching hopper 22. If the ingredients are allowed to remain overnight they may, when sufficient humidity exists, tend to lump thereby becoming unsuitable for accurate weighing purposes.

In such an instance, the valve 26 to a compartment 20 will be opened and its material will pass directly through weigh hopper 30 into supply hopper 32 from which it will exit through a rear trap 48 onto the continuous scale 40, the motion of whose belt has been reversed. The belt will then return the unsuitable material to a rear hopper 50 from which it will be returned by elevator 14 to the mill 16. The mill 16 will restore the material to proper size after which it can be returned to its particular compartment 20. The above step will, of course, be repeated for as many materials as are stored with the batching hopper 22.

Figure 7:
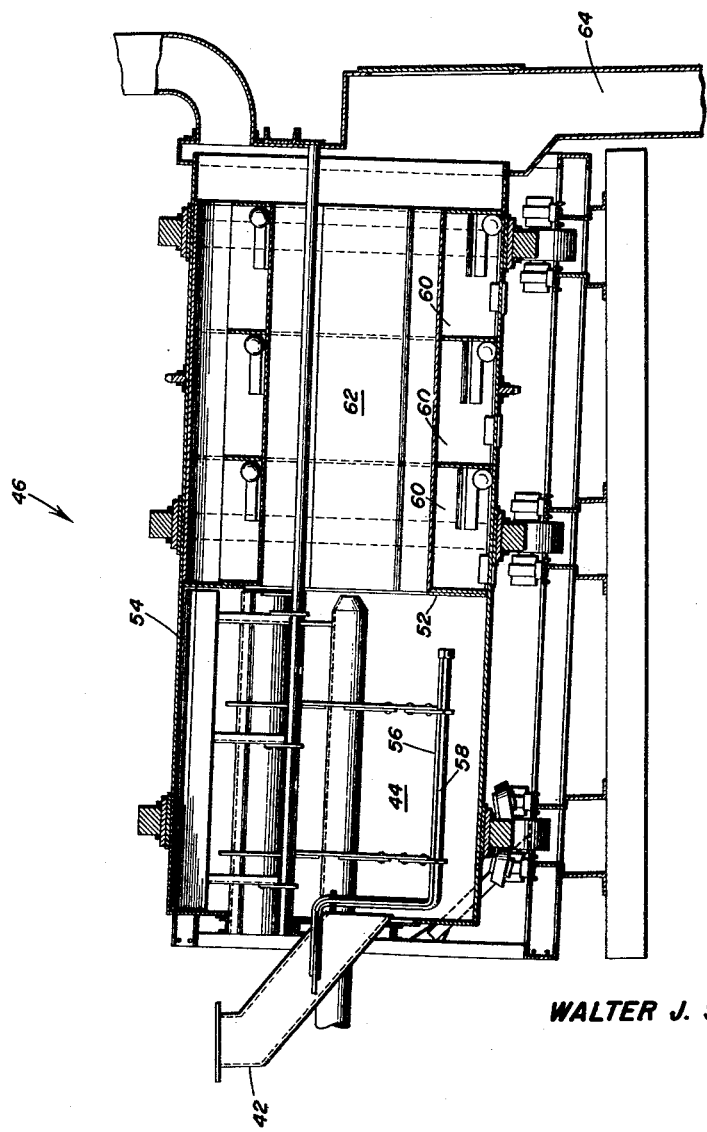
FIG. 7 is an axial cross-section through a preferred form of a combined ammoniator-granulator apparatus for use in the process of the present invention.

To continue, the fertilizer ingredients are fed at a constant rate through chute 42 into the ammoniator section 44 of the combined ammoniator-granulator 46 wherein a bed of the ingredients will build up against a dividing ring 52, shown best in FIG. 7. As drum 54 of the ammoniator-granulator 46 rotates, the ingredients in ammoniator section 44 are tumbled over and around pipes 56 and 58 through which are introduced metered flows of ammonia and acid respectively, with a resultant thorough mixing of the constituents.

As the bed of ammoniated and acidulated material builds up it begins to flow over the dividing ring 52 of the ammoniator-granulator 46 into the first of a plurality of adjacent tumbling compartments 60 within a granulator section 62 of the ammoniator-granulator 46. As the drum 54 continues to rotate, depending upon how full each compartment 60 may be and further depending upon the fluidity of the mixture, the mixture will flow from one compartment 60 to the next adjacent compartment.

Heated air from the ammoniating reaction is drawn lengthwise of the drum 54 toward the exhaust port. It is replaced by cool dry air which is drawn through the inlet chute 42 with the incoming materials, and which is then passed over the reacting materials in the ammoniating process. The hot air surface hardens the granules which are being formed from the mixture as it cascades from compartment to compartment and rolls over the various surfaces. A fully detailed understanding of the construction and functions of the ammoniator-granulator 46 may be had from an examination of my copending U.S. patent application Serial Number 715,648, filed February 17, 1958, now U.S. Patent No. 3,022,142.

Upon completion of the ammoniation-granulation phase in the ammoniator-granulator 46, the spherical granules, or pellets are fed through chute 64 to a gas or oil-fired direct heat rotary dryer 66 shown in FIG. 1 which is provided with a refractory lined combustion chamber 68. Granules from the dryer 66 then pass through a chute 70 into a rotary cooler 72 where they are cooled by a counter-current air flow. Moisture from both the dryer 66 and the cooler 72 is exhausted to atmosphere through a duct 74 and a stack 76. A cyclone 78 recovers fine dust through duct 74 from both the dryer 66 and cooler 72.

The treated material are next discharged from the cooler 72 into a third elevator 80 which conveys it through a chute 82 to a double deck classifying screen 84. This particular screen 84 sorts the material into three classifications, namely oversize, finished product, and fines. The oversize granules are passed through a duct 86 to a mill 88. The crushed oversize granules are then returned for reclassification through elevator 80 and duct 82 to the screen 84. The finished product is transported to storage through chutes 90 and 92.

The fines passing through screen 84 enter a hopper 94 which is provided with a fines splitter or valve gate 96. The splitter 96 for the fines can be adjusted to a setting which will direct an acceptable portion of the fines into the product stream to storage through chute 92. The remainder of the fines will be returned for reprocessing through a chute 98 to an adjustable dribble valve 100 which will slowly allow the rejected fines to combine with the virgin mixture being conveyed by elevator 38 to the ammoniator-granulator 46.

Those fines which have been recovered by cyclone 78 from the dryer 66 and cooler 72 will pass through a chute 102 and elevator 80 to the classifying screen 84 from which they are directed to reprocessing as described above.

Figure 3:
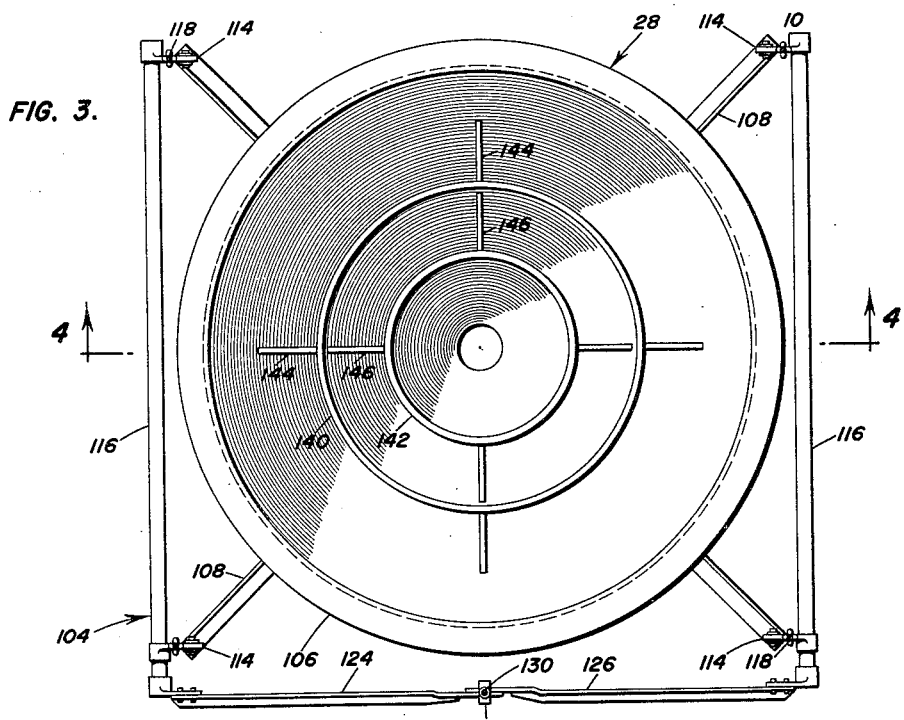
FIG. 3 is a horizontal section, on an enlarged scale, taken along line 3—3 of FIG. 2.
Figure 4:
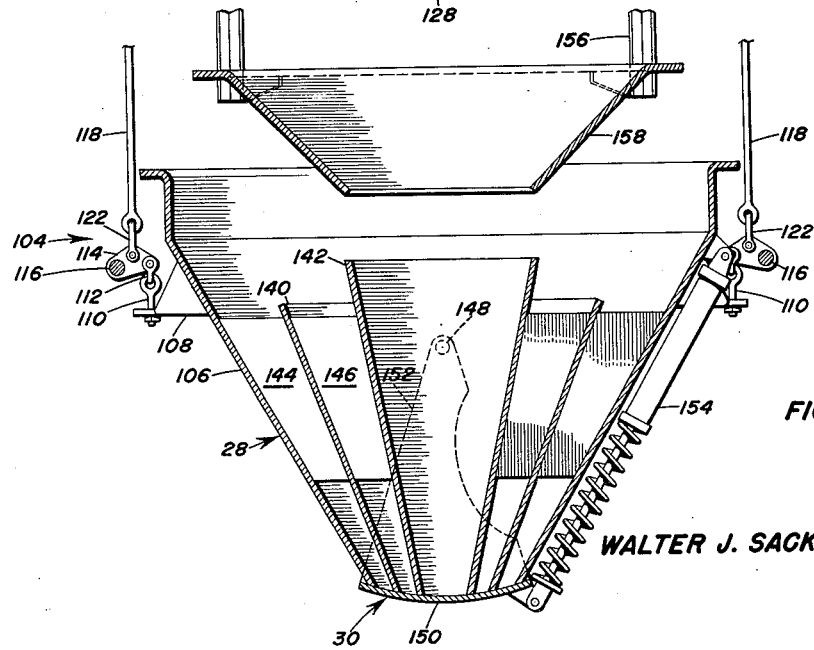
FIG. 4 is a cross-section taken along line 4—4 of FIG. 3.

FIGURES 2, 3, and 4 disclose in detail the construction of the novel weighing and mixing hopper 28 of the present invention and a generally typical method of arranging the hopper for use with a suspended scale system 104. The hopper 28 includes a conical main body 106 to which are welded, in cruciform arrangement, four triangular suspension gussets 108.

As best illustrated in FIGS. 3 and 4, each gusset 108 depends by means of eyebolts 110 and shackles 112 from a short fulcrum 114. Each fulcrum 114 is fixed to one end of a pair of torque shafts 116.

The entire preceding arrangement, in turn, is suspended by rods 118 whose upper ends are secured to brackets 120 on batching hopper 22, and the lower ends of which are secured by shackles 122 to the fulcrums 114 at a point approximately midway between the torque shaft 116 and its shackle 112.

As the scale hopper 28 is being loaded, fulcrums 114 will rotate the torque shafts 116 which will then drive a left hand lever 124 and a right hand lever 126 through short clockwise and counter clockwise arcs, respectively.

A portion of the load being weighed is thus applied by the inner ends of levers 124 and 126 to a knife edge 128 which is suspended by an adjustable rod 130 from one end of a balanced rocking lever 132. The lever 132 is suspended at its midpoint by a rod 134, the upper end of which is secured to a bracket 136 on hopper 22. The remaining end of the rocking lever 132 drives a steelyard rod 138 to actuate the scale 36.

A pair of truncated cones 140 and 142 are concentrically arranged and secured within the hopper body 106 by webs 144 and 146, respectively. As best illustrated in FIG. 4 the body 106 and the cones 140 and 142 have their lower ends, or apexes, cut away to form an arc struck about the axis of a hinge boss 148 located on body 106.

The discharge valve 30 is arranged with an arcuate closure plate 150 which is secured to a pair of generally triangular legs 152 that are mounted for rotation on boss 148. The advantages of such an arrangement over a bottom hinged trap are several. The more important of which are that the need for a latch is eliminated due to the fact that the load is balanced. In addition, there is the elimination of any necessity for the actuating cylinder to assist in supporting the load thereby allowing the use of a considerably lighter actuating cylinder 154. And, finally, there is a considerable saving in vertical space which would be required by a drop type trap door.

Immediately below the batching hopper 22, a shallow cone 158 is suspended by legs 156 whose function it is to center the various ingredients as they are discharged through valves 26, from their respective compartments 20.

Figure 5:
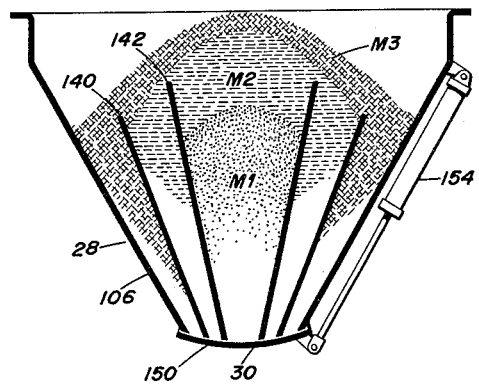
FIG. 5 is a somewhat diagrammatic cross-section taken through the mixing and weighing hopper detailed in FIGS. 2, 3, and 4, and illustrates the manner in which various materials become arranged during the weighing step of the apparatus of the present invention.
Figure 6:
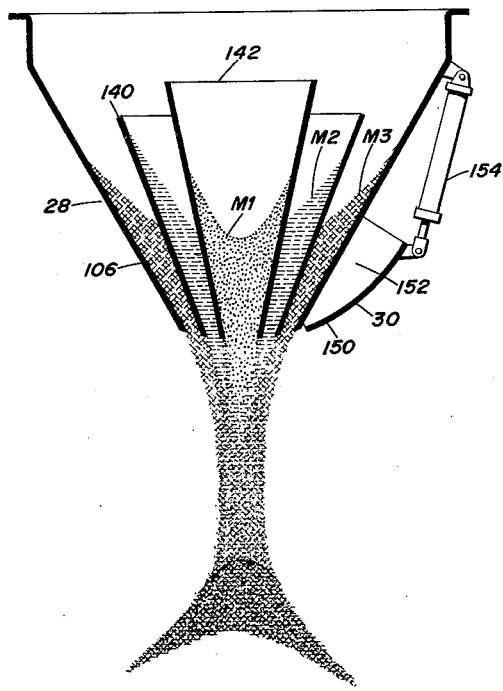
FIG. 6 is a further diagrammatic cross-section similar to FIG. 5 but showing the manner in which the weighed materials are blended upon release from the hopper.

A clear understanding of the manner in which the various ingredients are caused to become thoroughly mixed can be had from an examination of FIGS. 5 and 6. As shown in FIG. 5, a first ingredient M1 (stipple shading) will be deposited within cone 142 during weighing. A second ingredient M2 (horizontal dotted lines) to be weighed will fill the remaining space in cone 142 and then flow over into cone 140. A third ingredient M3 (double crosshatch shading) will cover the surface of the preceding ingredient and then flow over into the main hopper body 106. As shown in FIG. 6, when the valve 30 is swung open, the openings of all the cones 28, 140, and 142 will be exposed almost simultaneously thereby permitting the various ingredients M1, M2, M3 to discharge simultaneously and intermix as they drop into the supply hopper 32. While three ingredients are above indicated, actually any number of different materials can be used with this unit.

Obviously many modifications and variations of the present invention are possible in light of the above teachings. It is, therefore, to be understood that within the scope of the appended claims the invention may be practiced otherwise than as specifically described.

What is claimed is:

1. A materials processing and handling system, comprising, an elevated mill for receiving and reducing different materials into ingredients, a batching hopper with a plurality of compartments for receiving the reduced ingredients segregated from each other, valve means positioned at the bottom of each compartment for discharging the ingredients therefrom, a weighing hopper positioned below said batching hopper and having a plurality of co-axially arranged inverted truncated shaped cones defining chambers therebetween for successively receiving said ingredients from said compartments of said batching hopper, fulcrum means for supporting said weighing hopper from said batching hopper, a balance weighing system mechanically coupled to said fulcrum means for continuously weighing the ingredients in said weighing hopper, a supply hopper positioned below said weighing hopper, and discharge valve means for the small ends of said inverted truncated shaped cones defining chambers therebetween for simultaneously discharging the ingredients from said chambers to said supply hopper to intermix said ingredients therein in a common discharge column.

2. A materials processing and handling system as recited in claim 1, and additionally means including a continuous scale for continuously weighing the mixed ingredients from said supply hopper.

3. A materials processing and handling system as recited in claim 1, wherein the upper end of the innermost inverted truncated cone is elevated above the next outer inverted truncated cone, with the upper end of the outer-most inverted truncated cone being positioned above the intermediate inverted truncated cones.

4. A materials processing and handling system as recited in claim 3, wherein the lower ends of said inverted truncated cones are arcuate in shape, and said valve means includes an arcuate shape member for closing the annular openings in the lower ends of said cones.

5. A materials processing and handling system as recited in claim 1, and additionally pneumatic means for operating said valves means for each compartment.

6. A materials processing and handling system as recited in claim 1, wherein said batching and supply hoppers are each of inverted conical section.

7. A materials processing and handling system, comprising, an elevated mill for receiving and reducing ingredients to predetermined sizes, a batching hopper with a plurality of compartments for receiving and reduced ingredients segregated from each other, valve means positioned at the bottom of each compartment for discharging the ingredients therefrom, a weighing hopper positioned below said batching hopper and having a plurality co-axially arranged inverted truncated shaped cones defining chambers therebetween for successively receiving said ingredients from said compartments of said batching hopper, fulcrum means for supporting said weighing hopper from said batching hopper, a balance wieghing system mechanically coupled to said fulcrum means for continuously weighing the ingredients in said weighing hopper, a supply hopper positioned below said weighing hopper, discharge valve means for small ends of said inverted truncated shaped cones defining chambers therebetween for simultaneously discharging the ingredients from said chambers to said supply hopper to intermix said ingredients therein in a common discharge column, means including a scale for continuously weighing the mixed ingredients from said supply hopper, means for continuously ammoniating and granulating said weighed mixed ingredients and forming them into granules, and means for drying said granules.

8. A materials processing and handling system, comprising means for receiving and reducing ingredients to predetermined sizes, means with a plurality of compartments for receiving the reduced ingredients segregated from each other, means positioned at the bottom of each compartment for discharging the ingredients therefrom, means positioned below said compartmentalized means and having a plurality of co-axially arranged inverted truncated shaped cones defining chambers therebetween for successively receiving said ingredients from said compartments, fulcrum means for supporting said cones for weighing thereof with their respective ingredients, a balance scale weighing means mechanically coupled to said fulcrum means for continuously weighing the ingredients in said cone chambers, a supply receiver positioned below said cones, discharge valve means positioned at the small ends of said inverted truncated shaped cones for simultaneously discharging the ingredients from said chambers to said supply receiver to intermix said ingredients therein in a common discharge column, means including a continuous scale for continuously weighing the mixed ingredients from said supply receiver, means for continuously ammoniating and granulating said weighed mixed ingredients and forming them into granules, and means for drying granules.

9. A materials processing and handling system, as recited in claim 8, and means for reconveying said weighed mixed ingredients back to said first mentioned means for further reduction thereof.

10. A materials processing and handling system as recited in claim 8, wherein said ammoniating-granulating means is elevated, and additionally means for continuously conveying said weighed mixed ingredients to said ammoniating-granulating means.

11. A materials processing and handling system as recited in claim 8, and additionally means for cooling said dried granules.

12. A materials processing and handling system as recited in claim 11, and cyclone means for recovering fine dust from said dried granules.

13. A materials processing and handling system as recited in claim 11, and means for classifying said cooled granules into oversize, finished product, and fines.

14. A materials processing and handling system as recited in claim 13, and means for receiving and crushing said oversize granules and returning them to said classifying means.

15. A materials processing and handling system as recited in claim 14, and means for returning a selected portion of said fines to said ammoniating-granulating means for further processing with said weighed mixed ingredients.

16. A materials processing and handling system as recited in claim 11, and means for introducing a countercurrent air flow into said cooling means for cooling said dried granules.

17. A materials processing and handling system as recited in claim 16, and means for drying said granules with preheated air from said cooling means preceding the cooling thereof by said cooling means.

References Cited in the file of this patent

UNITED STATES PATENTS

| | | |
|---|---|---|
| 1,960,030 | Sackett | May 22, 1934 |
| 2,913,330 | Wilson | Nov. 17, 1959 |
| 2,917,381 | Otto | Dec. 15, 1959 |